(12) United States Patent
Boeker et al.

(10) Patent No.: US 10,860,452 B1
(45) Date of Patent: Dec. 8, 2020

(54) SYSTEMS AND METHODS FOR CONTROLLING HARDWARE DEVICE LIGHTING IN MULTI-CHASSIS ENVIRONMENT

(71) Applicant: Hewlett Packard Enterprise Development LP, Houston, TX (US)

(72) Inventors: Craig A. Boeker, Houston, TX (US); Justin York, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/450,834

(22) Filed: Jun. 24, 2019

(51) Int. Cl.
   *G06F 11/32* (2006.01)
   *H04L 12/40* (2006.01)
   *G06F 9/50* (2006.01)

(52) U.S. Cl.
   CPC .......... *G06F 11/325* (2013.01); *G06F 9/5027* (2013.01); *H04L 12/40* (2013.01); *H04L 2012/40215* (2013.01)

(58) Field of Classification Search
   CPC ...... G06F 11/325; G06F 9/5027; H04L 12/40; H04L 2012/40215
   See application file for complete search history.

(56) References Cited

U.S. PATENT DOCUMENTS

| 8,941,307 | B1 | 1/2015 | Chung et al. |
| 9,160,168 | B2 | 10/2015 | Chapel et al. |
| 9,198,264 | B2 | 11/2015 | Challapali et al. |
| 9,734,676 | B2 | 8/2017 | Apcar |
| 9,870,692 | B2 | 1/2018 | Aichang et al. |
| 2011/0066895 | A1* | 3/2011 | Windell ............. G06F 11/325 714/43 |
| 2016/0140868 | A1* | 5/2016 | Lovett ............. G09B 19/0053 434/118 |
| 2017/0308143 | A1 | 10/2017 | Kunnathur Ragupathi et al. |

OTHER PUBLICATIONS

Edsall, T.; "Turn the Lights on in the Data Center"; Feb. 1, 2017; 8 pages.

* cited by examiner

*Primary Examiner* — Ryan W Sherwin
(74) *Attorney, Agent, or Firm* — Sheppard Mullin Richter & Hampton LLP

(57) ABSTRACT

Systems and methods for controlling one or more visual indicators, such as unit identification devices (UIDs), are provided. Control of such visual indicators allows lighting sequences to be displayed vis-à-vis the visual indicators in a data center or similar environment including multiple hardware devices or units, such as server blades in multiple chassis enclosures in a data center. In this way, users such as data center administrators, information technology (IT) personnel, etc. can be alerted to hardware events that impact hardware devices or units, such as hardware faults. The visual indicators can be controlled in such a way that animated lighting sequences can be used to guide users to the hardware devices or units experiencing the hardware event(s).

19 Claims, 8 Drawing Sheets

SYSTEMS AND METHODS FOR CONTROLLING HARDWARE DEVICE LIGHTING IN MULTI-CHASSIS ENVIRONMENT

DESCRIPTION OF RELATED ART

Data centers and similar environments may include large numbers of often identical racks of hardware/hardware units with components available from both the front and rear of the racks. Finding a particular component in a particular rack can be difficult in such an environment. To aid with component identification, hardware manufacturers often include one or more UIDs (unit identification) on the component. UIDs may be some form of light source (often a light emitting diode (LED)) or some form of display, e.g., a liquid crystal display (LCD). This allows an administrator(s) of a data center to enable or turn on a UID light for a component that needs attention—it may need to be replaced, reseated, have cables to it re-plugged, etc.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1A:
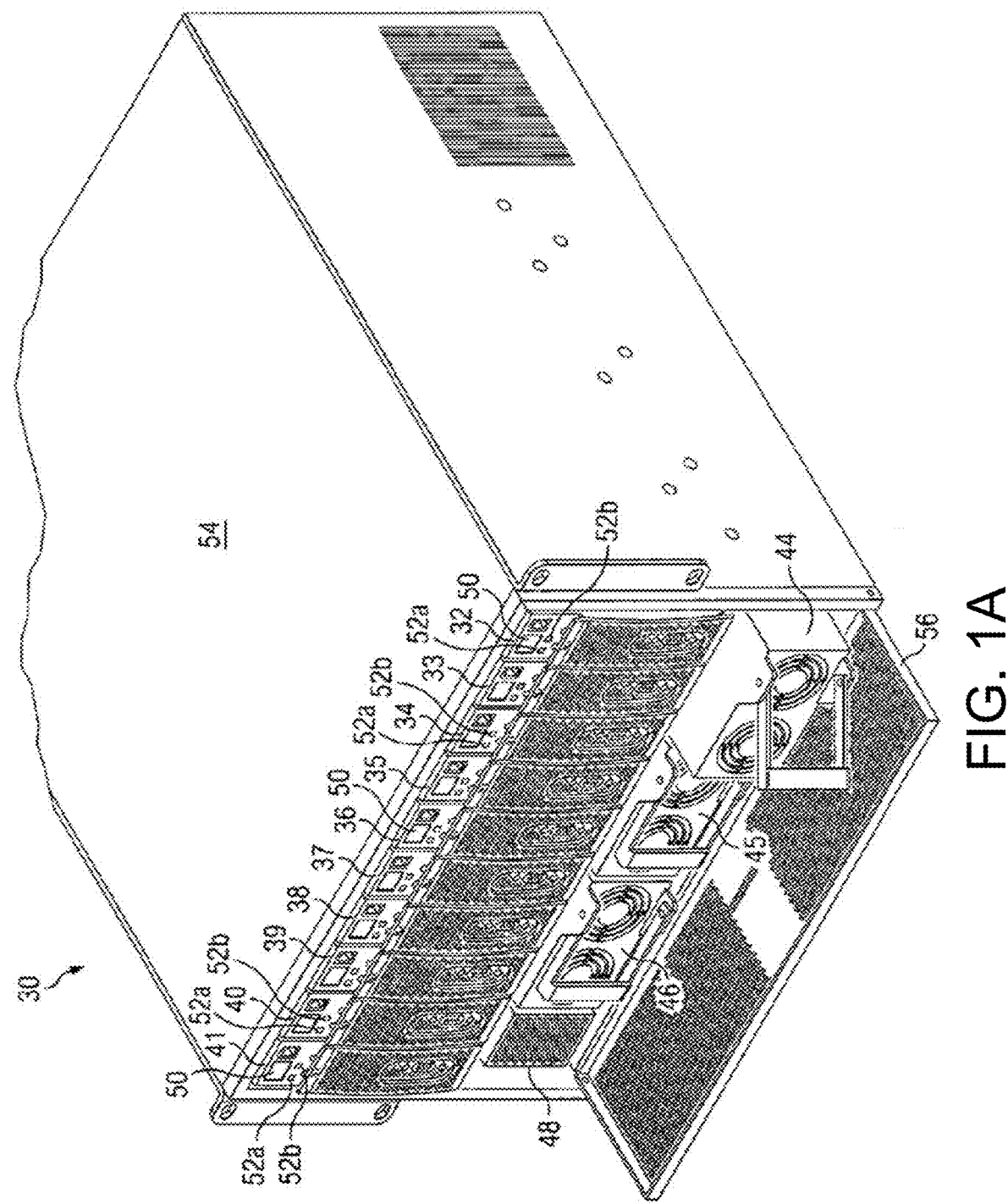
FIG. 1A illustrates an example of a hardware unit chassis in accordance with various embodiments.

The figures are not exhaustive and do not limit the present disclosure to the precise form disclosed.

DETAILED DESCRIPTION

As noted above, data centers and similar computing environments may include a myriad of hardware, much of which may look identical/similar to one another, making identification of a particular hardware unit difficult. Accordingly, UIDs may be provided to assist with hardware unit identification. Additionally, UIDs in the form of LEDs or LCDs, for example, may be used to display activity information relating to a rack, chassis, and/or its components, such as the hardware units, which can be memory devices, network servers, or other computing devices. However, the density of hardware units or components within a given volume of a rack/chassis has increased over the years in order to meet demands for speed and processing power. These increases in density limit the amount and type of information that can be easily displayed using UIDs. For example, enabled or active UIDs may, in some scenarios be left on, resulting in a rack/chassis having multiple hardware units "identified" as having an issue. This can make it difficult for an administrator or technician, for example, to identify a hardware unit or component that he/she actually wishes to service. It should be understood that as used herein, the term "hardware," "hardware unit", or "component" (as used in the context of devices identifiable via UIDs or similar lighting sources/displays) can refer to any electronic or mechanical device used in the operation of servicing a workload. This may include, but is not limited to, robotic devices in a factory, traditional server equipment in a datacenter, etc.

Accordingly, various embodiments provide a lighting controller that can control or manipulate one or more visual indicators, as desired, to generate signals, alerts, or other notifications. It should be understood that such visual indicators are generally implemented as UIDs, but various embodiments disclosed herein contemplate any type of visual indicator associated with hardware as disclosed in this context. Thus, although various embodiments are described as controlling one or more hardware UIDs, various embodiments are also capable of controlling other types of visual indicators. In this way, users, administrators, or other personnel can be alerted to events impacting hardware units, and can also be directed to a hardware unit actually at issue. In some embodiments, a combination of UIDs or a particular lighting sequence involving one or more UIDs can signify different events, types of events, direct personnel to a particular hardware unit, etc. Especially in the case of multiple UIDs, embodiments provide the ability to control UIDs simultaneously or in some desired sequence to signify one or more events.

In particular, an inventory of all (or subset(s) of all) hardware units within a data center or similar environment can be determined. A coordinate map can also be generated or determined, and a correlation between the coordinates of the map and UIDs of hardware units can be made. In this way, the lighting controller is aware of what hardware unit UIDs may need to be controlled in order to effectuate a desired lighting sequence. Moreover, because of this determined correlation, the lighting sequence can be generated or planned in an agnostic fashion with regard to the hardware units. That is, it does not matter which or what hardware unit(s) are present as the lighting controller need only be concerned with whether or not a particular UID that corresponds to a particular coordinate location should be enabled/activated, and how that enablement/activation occurs.

For example, in response to the occurrence of some hardware event, such as a hardware fault event, a hardware unit at issue (i.e., the hardware unit that experienced or is experiencing the hardware event) can be identified. Some lighting sequence can also be determined for identifying that hardware unit to a user, administrator, IT personnel, etc. The lighting sequence may be, for example, sequential or parallel activation of one or more UIDs that ultimately "lead" to the hardware unit at issue, such one or more UIDs being activated in a sequence beginning at a first hardware unit, and progressing in a direction towards the hardware unit at issue. Accordingly, the aforementioned lighting controller may transmit UID control commands to the relevant components or hardware units corresponding to the desired lighting sequence.

In some embodiments, this transmission or messaging of UID control commands may be accomplished through the use of a RESTFUL application program interface (API) through which JavaScript Object Notation (JSON) documents can be sent. In other embodiments, the relevant hardware unit(s) may be reached as part of a controller area network (CAN) bus network, where a hardware unit (or more specifically a local UID controller) may act on control command messages applicable to that hardware unit/local UID controller. In still other embodiments, a local complex programmable logic device (CPLD) may be controlled to effectuate the desired lighting sequence. It should be understood that the examples discussed above and the examples that follow are not meant to be limiting. It should also be understood that the activation (and/or deactivation) of one or more UIDs may be triggered by one or more policies applicable to a particular hardware unit(s).

FIG. 1A illustrates a multiple server blade chassis 30, in accordance with a particular embodiment of the present invention. It should be understood that a server blade chassis is merely one example of an environment or system in/across which various embodiments may be implemented. It is contemplated that various embodiments are implementable in other types or configurations of racks, chassis, enclosures, etc. Server blade chassis 30 may include a plurality of server blades 32-41. Server blade chassis 30 may also include a plurality of network interface cards to provide server blades 32-41 access to one or more communication networks, as further illustrated and discussed below with respect to FIG. 3. In the illustrated embodiment, server chassis 30 is a 6U×28" chassis configured to receive up to ten server blades, and provide access to a plurality of independent networks. The chassis size and number of server blades and/or network interface cards included with server blade chassis 30 may vary within the teachings of the present invention. As used herein, the term "blade" may include a card or other device comprising a printed circuit board and related components operable to be inserted into a chassis for coupling with other cards or network components.

Each server blade 32-41 may include a UID, such as a respective liquid crystal display (LCD) 50 and a plurality of associated control keys or buttons 52 for controlling the server blade and the LCD. Each LCD 50 is able to display information relating to its respective server blade. For example, in some embodiments an LCD 50 may be operable to display network configuration information such as internet protocol (IP) address and slot, rack or chassis identification or assignment information for its respective server blade and related network components. LCDs 50 may incorporate backlighting of various colors in certain situations to convey messages and server blade status to a user.

In some embodiments, a server blade may include control keys 52 may be used both to control the information displayed on LCDs 50 and to control and/or manage the operation of the server blades. Thus, LCDs 50 and associated control keys 52 provide a graphical, menu driven interface through which component information may be displayed and component operations may be controlled. Each LCD 50 and associated control keys 52 may be controlled by a respective processor, such as an embedded remote management module, of the component upon which the LCD is positioned. Providing server blade information on respective LCDs of each blade enables a user to monitor server blade status and network information and to control server blade and other chassis component operations without having to hook up a separate device such as a keyboard or monitor to the server blade. Moreover, the graphical, menu driven interface provides ease in understanding and use by a user. As discussed below, other chassis components may also utilize LCDs and associated control keys to display component information and to control component operations.

In some embodiments, some chassis components such as server blades may include a light emitting diode (LED) in order to display network configuration information to an observer of the chassis. In such cases, the particular chassis component displaying such network configuration information may not include an LCD. As discussed above, network configuration information may include IP addresses of network components and rack, chassis and slot identifications and assignments.

Chassis 30 may also include a plurality of power supplies 44-46 positioned within chassis 30 below server blades 32-41. Power supplies 44-46 can provide power to components of chassis 30. The illustrated embodiment includes three power supplies 44-46, although other embodiments may include a different number of power supplies. In some embodiments, power supplies 44-46 may comprise three 1500 W power supplies providing up to 3000 W DC output in a 2+1 redundant configuration and three independent AC power connections for AC input redundancy. Chassis 30 may also include a grill 48 next to power supplies 44-46 for inletting air to cool components of chassis 30, such as rear input/output blades.

Each server blade 32-41 and power supply 44-46 may be at least partially enclosed within a box build 54. A hinged power supply door 56 can be configured to enclose the power supplies within box build 54 and to provide access to the power supplies as needed for provisioning, service, maintenance and/or replacement. Box build 54 and power supply door 56, in combination, may provide the ability to protect server blades 32-41, power supplies 44-46 and other chassis 30 components from ambient environment and/or damage.

Figure 1B:
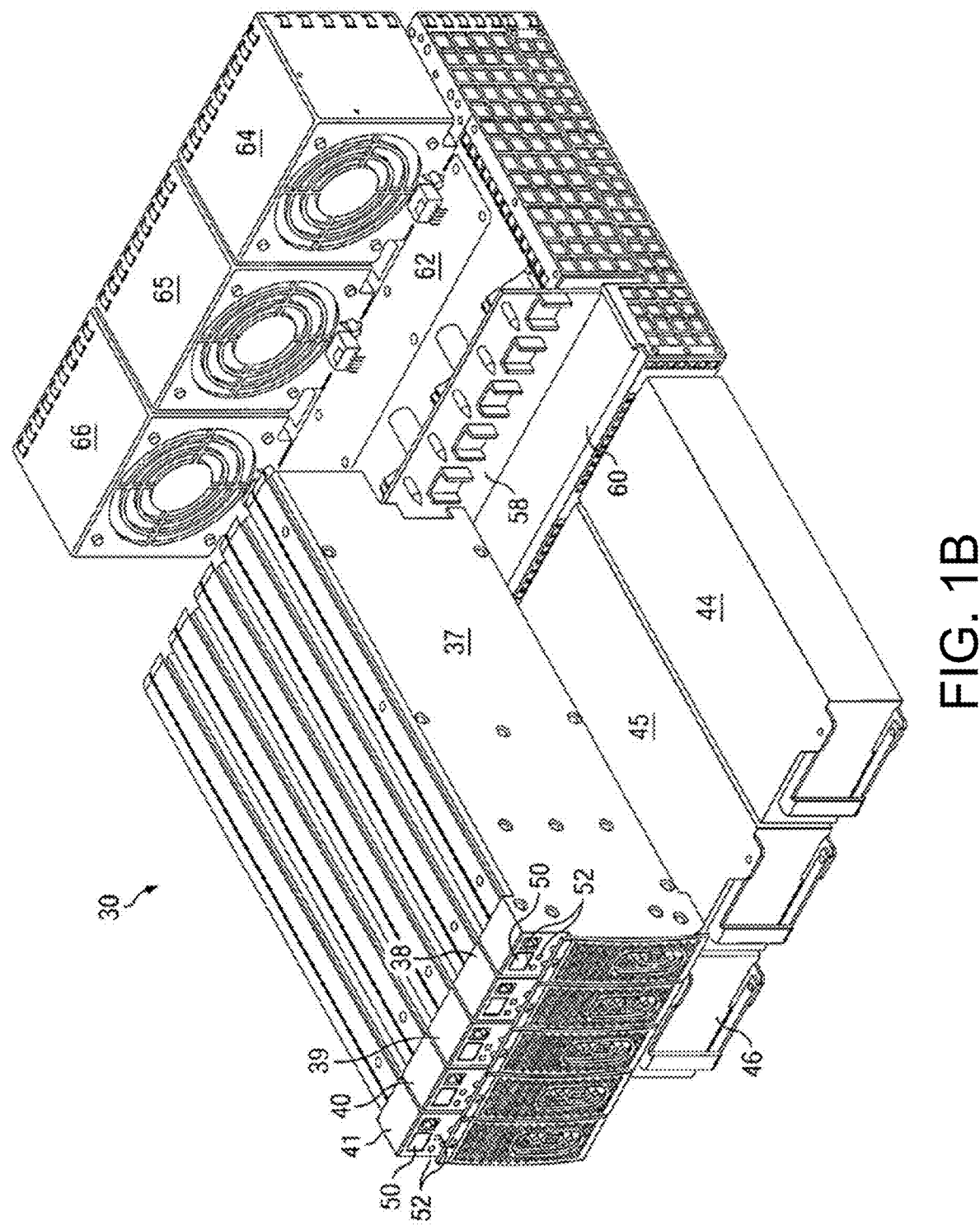
FIG. 1B is a perspective illustration of a boxless view of the hardware units enclosed by the hardware unit chassis of FIG. 1A.

FIG. 1B illustrates server blade chassis 30 of FIG. 1A without an enclosing box build such that additional components may be illustrated. In FIG. 1B, server blades 37-41 are coupled to a midplane 58 of chassis 30 through which power and connectivity passes. Power supplies 44-46 are coupled to a power plane 60 of chassis 30. Chassis 30 may also include cooling fan modules 64-66 to cool chassis server blades and other chassis components. Cooling fan modules 64-66 may be controlled by a chassis management blade through a fan control board 62 and may include one or more light emitting diodes (LEDs) to indicate fan module status. In particular embodiments, each cooling fan module 64-66 may include two cooling fans for redundancy. Chassis 30 includes three 120 mm cooling fan modules 64-66. However, it should be understood that other embodiments may include another number or type of cooling fan modules to cool server blades of a chassis.

Figure 1C:
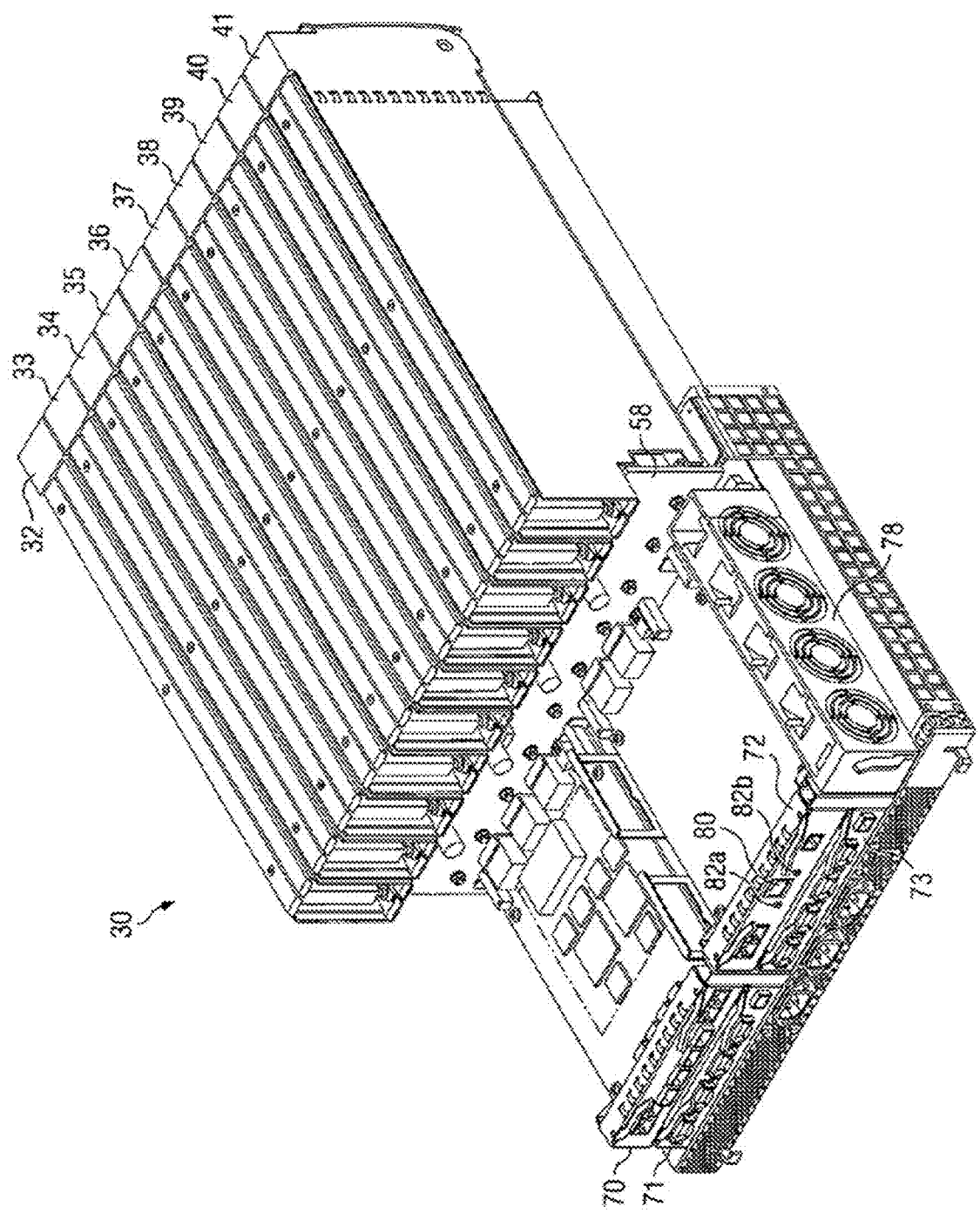
FIG. 1C is another perspective illustration of the boxless view of the hardware units enclosed by the hardware unit chassis of FIG. 1B

FIG. 1C illustrates chassis 30 of FIG. 1A from a different angle, in accordance with a particular embodiment of the present invention. As illustrated, server blades 32-41 are each coupled to midplane 58. Chassis 30 includes rear blades 70-73 for coupling the server blades and other chassis components to one or more networks, external switches or other devices and for managing chassis 30 and its components. More specifically, the illustrated embodiment includes an ethernet switch 70, input/output (I/O) blades 71 and 73 and a chassis management blade 72. Other embodiments may include other types of rear blades providing other functionality for components of chassis 30. In this embodiment, chassis management blade 72 includes an LCD 80 and associated control keys 82 for controlling certain operations of chassis management blade 72 as further discussed below.

Chassis 30 also includes a network fan module 78 for cooling network cards 70-73. In particular embodiments, network fan module 78 may comprise a 60 mm fan module with four fans for redundancy. Network fan module 78 may be controlled by a chassis management blade and may include one or more LEDs to indicate fan module status.

Figure 2:
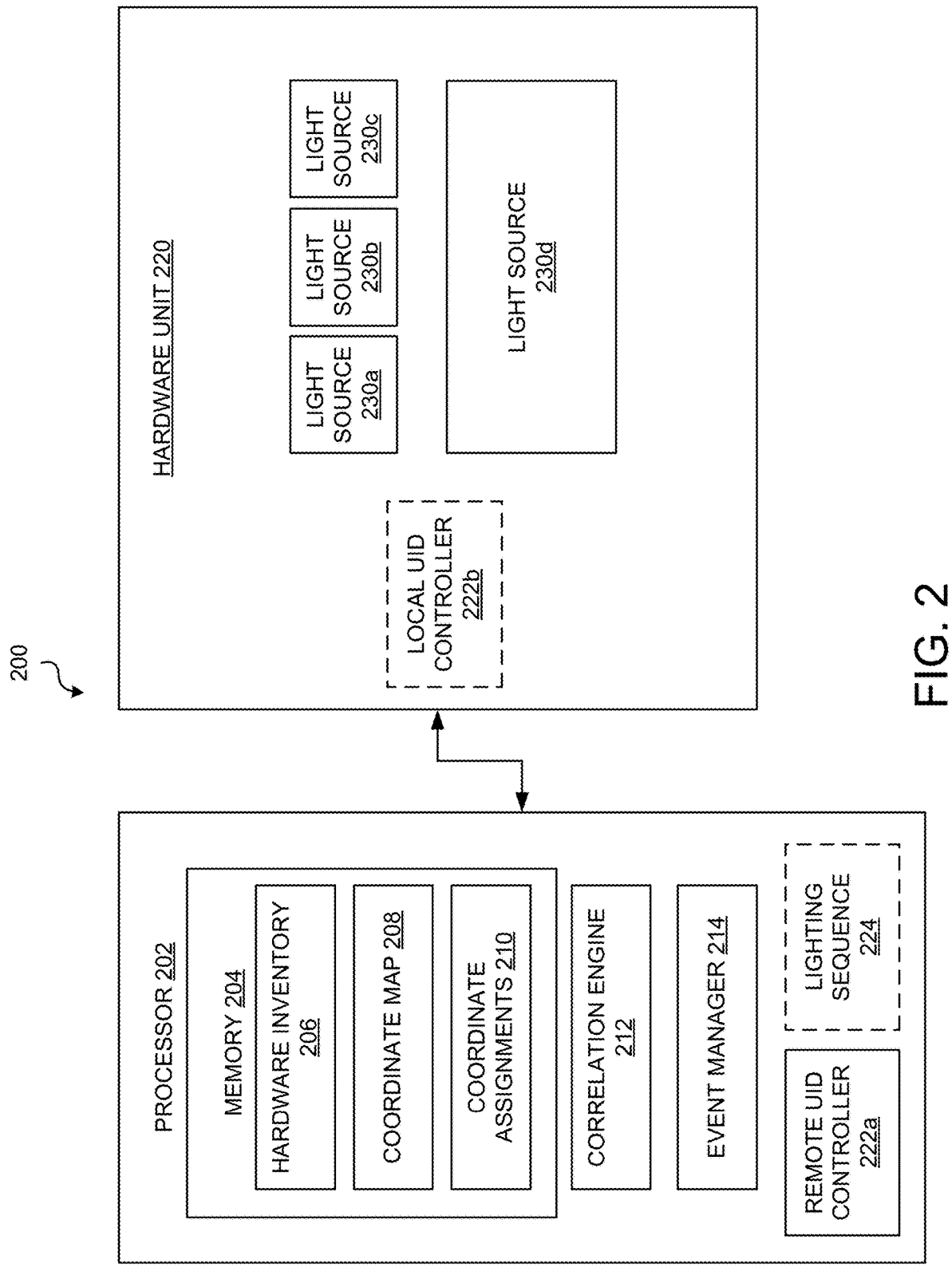
FIG. 2 illustrates an example UID control system in accordance with various embodiments.

FIG. 2 illustrates an example UID control system 200 that in some embodiments may include a processor 202 that operates remotely relative to a hardware unit 220. For example, a data center or similar environment may include a computer, workstation, a network of computers/workstations, etc. which may be used to monitor and/or control operations, generally, in the data center. For example, processor 202 may be an example embodiment of a data center management processor. In some embodiments, processor 202 may be a baseboard management controller, an example of a which is a Hewlett Packard Enterprise Integrated Lights-Out (iLO) management processor that allows a user to, e.g., query and display status of one or more servers, display server configurations, provide server configuration, etc.

Operating in conjunction with the processor 202 may be a memory unit 204 in which hardware inventory 206, a coordinate map 208, and coordinate assignments 210 may be stored. Hardware inventory 206 may comprise a listing or similar accounting of any hardware units or components present in the data center, a certain subsection or portion of the data center, etc. Coordinate map 208 may comprise a 2D or 3D representation of x, y, (and z) coordinates upon which a desired lighting sequence may be based. For example, it may be determined that a plurality of UIDs should be sequentially activated to direct a user to a target hardware unit experiencing a hardware fault, such as a loss of network connectivity.

It should be noted that an event manager 214 may detect any events occurring across system one or more hardware units, such as hardware unit 220. In response, it may be determined that a first UID of a first chassis should be activated, a second UID of a second, neighboring chassis should be subsequently activated, a third UID of a third chassis neighboring the second chassis (in the direction of the target hardware unit) should be activated thereafter, and so on until a UID of the target hardware unit is activated. In some embodiments, a lighting sequence 224 may be specified in terms of coordinates and light source actions. In some embodiments, a lighting sequence may be more dynamically determined/specified at run-time, substantially immediately after an event(s) has occurred.

To accomplish this lighting sequence, the coordinate map 208 may provide a mechanism for characterizing or setting forth the sequence according to which UIDs may be activated and/or deactivated depending on what hardware unit or which UID of a particular hardware unit happens to coincide with a particular coordinate. That is, if a lighting sequence involves activating a particular UID (which may be a server blade LED) at a particular coordinate location, knowledge of the hardware inventory 206 allows a correlation engine 212 to correlate or map any UIDs associated with the hardware inventory 206 to the coordinates of coordinate map 208. This may be reflected in coordinate assignments 210, where a particular coordinate is associated with a particular UID.

A remote UID controller 222a may communicate lighting control commands in accordance with the desired lighting sequence (at the desired coordinates) to the appropriate UID(s) vis-à-vis a local UID controller 222b which can be implemented at a hardware unit 220. The local UID controller 222b may in turn control (activate and/or deactivate) the applicable light sources, e.g., any one or more of 230a-d. As will be discussed below, a local UID controller 222b may not be necessary, as remote UID controller 222a can be configured to communicate with and directly command one or more of light sources 230a-d.

As alluded to above, a hardware unit, such as hardware unit 220 may include various types of UIDs, including (as shown in FIG. 2) a plurality of LEDs (light sources 230a-c), and an LCD (light source 230d). Controlling light sources 230a-c, may include transmitting RGB values, intensity values, etc. according to which light sources 230a-c should be active.

In accordance with some embodiments, UIDs may comprise tri-color LEDs capable of displaying various different colors, where three physically discrete LEDs may be positioned proximate to one another in a single assembly. The three discrete LEDs are capable of providing light at a fixed number of lumens (perceived brightness) and at a fixed wavelength (perceived color). Those colors are typically red, blue, and green. The number of lumens associated with each discrete LED may vary, but typically fall within some range. When the three discrete LEDs are lit, the perceived color can be bright white, when one of the three discrete LEDs is lit, e.g., a red LED, while the green and blue LEDs are not lit, the perceived color can be a pure red, and so on.

The creation of different colors can be achieved by fluctuating the percentage of time that each of the three discrete LEDs (also referred to as a "sub-LED") is actually lit. For example, activating a blue sub-LED 100% of the time, a red sub-LED 50% of the time, while a green sub-LED is inactive (or active 0% of the time) yields a dark purple. Accordingly, depending on a desired lighting sequence, various sub-LEDs of a UID may be controlled to activate/deactivate, remain active, remain inactivate, etc. for a desired period of time. For example, a desired lighting sequence may involve lighting a particular UID to a purple color for 10 seconds. Accordingly, remote UID controller 222a may instruct local UID controller 222b to activate light source 230a (which may be a tri-color LED) such that the blue sub-LED of light source 230a is active for the entire 10 seconds, and the red sub-LED of light source 230a is active for 5 seconds. It should be understood that the time during which a particular sub-LED may be interspersed with the time another sub-LED is active.

Pulse-width modulation (PWM) may be used to translate or convert a desired percentage of time into actual pulsing of the sub-LEDs from on to off. For example, if a red sub-LED is to be active 100% of the time during which the UID is to be active, a cycle time of 1/100 of a second can be used meaning that 100 times in one second, the red sub-LED can be active/lit. Conversely, if a desired lighting sequence involves activating a red sub-LED for only one percent of the time during which the UID is to be active, an activation pulse is transmitted to the red sub-LED once out of every 100 clock ticks. It should be understood that the UID will still appear red, but dimmer to the human eye. In other words, LEDs or sub-LEDs can be pulsed according to a "width" that equates to the number of times an LED/sub-LED is activated versus the number of times the LED/sub-LED is inactive.

It should be understood that a hardware unit or component containing one or more LEDs can be controlled via firmware. That firmware presents an interface with which the one or more LEDs controlled, e.g., vis-à-vis local UID controller 222*b* and/or remote UID controller 222*a*. The interface may be present on a publicly-accessible transport, e.g., an Ethernet network, or it may be accessed via an internal proprietary bus from other hardware units like disk drives in a JBOD or fans in an enclosure on a CAN bus.

Remote UID controller 222*a* or local UID controller 222*b* through which the lighting sequence control commands may be received can communicate over any protocol that is supported by the hardware unit. This may include, but is not limited to REST, SOAP, a CAN bus protocol, or proprietary protocols. Thus, both remote UID controller 222*a* and local UID controller 222*b* may support any APIs or protocols necessary for communicating with hardware units in a particular environment, different layers of a network, etc. For example, in a REST-based implementation, during a POST or PATCH operation, a JSON document can be sent that includes the control commands (e.g., PWM settings, intensity if desired, etc.) for each of the three RGB LEDs. In some embodiments, the control commands can be specified just as RGB settings, e.g., 7F3828.

As an example, remote UID controller 222*a* in accordance with one embodiment, transmits at least three values to local UID controller 222*b*, which may be an LED PWM controller. The three values may comprise a sub-LED color to activate/deactivate/keep inactive, and a percentage value indicative of time or "width." In some embodiments, an intensity value may also be transmitted. An example of these values is as follows:

{
  "Red": 100,
  "Green": 100,
  "Blue": 100,
  "Intensity": 100
}

As alluded to above, various embodiments are directed to providing light sequences, which in some embodiments may comprise animations or shows made of certain "movements" of light. Accordingly, in some embodiments, a duration value may also be specified in a control command message sent from remote UID controller 222*a* as follows:

{
  "Red": 100,
  "Green": 100,
  "Blue": 100,
  "Intensity": 100,
  "DurationMS": 100
}

The duration value can specify to local UID controller 222*a* how long (in this example, milliseconds (MS)) to display a given RGB color at a given intensity before deactivating the LED/sub-LED. In some embodiments, a starting set of RGB and intensity values, an ending set of RGB and intensity values, and a duration may be specified. In this way, lighting sequences can be specified where color transitions can be displayed after expiration of a specified duration. An example of sets of values comprising a UID control command is as follows:

[
{
  "Red": 100,
  "Green": 100,
  "Blue": 100,
  "Intensity": 100,
  "DurationMS": 100
},
{
  "Red": 100,
  "Green": 0,
  "Blue": 0,
  "Intensity": 100,
  "DurationMS": 100
},
{
  "Red": 0,
  "Green": 100,
  "Blue": 0,
  "Intensity": 100,
  "DurationMS": 100
},
{
  "Red": 0,
  "Green": 0,
  "Blue": 100,
  "Intensity": 100,
  "DurationMS": 100
},
{
  "Red": 0,
  "Green": 0,
  "Blue": 0,
  "Intensity": 0
}
]

The above set of a values would result in a UID control command resulting in a single tri-color LED turning bright white for one second, turning bright red for one second, turning green for one second, turning blue for one second, and turning off.

In the case of light source 230*d*, which may be an LCD display, remote UID controller 222*a* may transmit text, images, or other visual media to display thereon. For example, light source 230*d* may be instructed by remote UID controller 222*a* to display an arrow pointing in the direction of the target hardware unit. Upon receiving the commands, local UID controller 222*b* or the light sources themselves (directly) may activate/deactivate as appropriate. For an LCD device that is incorporated into an animated lighting sequence, LCD control commands can be sent in a raster, inasmuch as LCDs are adept at converting rasters into pixel behavior. It should be understood that a raster can be thought of as an array of RGB values that maps to every single pixel in the LCD's matrix of lights. To pass in rasters quickly, a bitstream approach can be utilized, where a high-speed signal pumps in a stream of bits representing the array. They are sent one per "refresh cycle" so it can get updated, e.g., 30 times per second. In many cases, the same image could be displayed over multiple refresh cycles.

Figure 3:
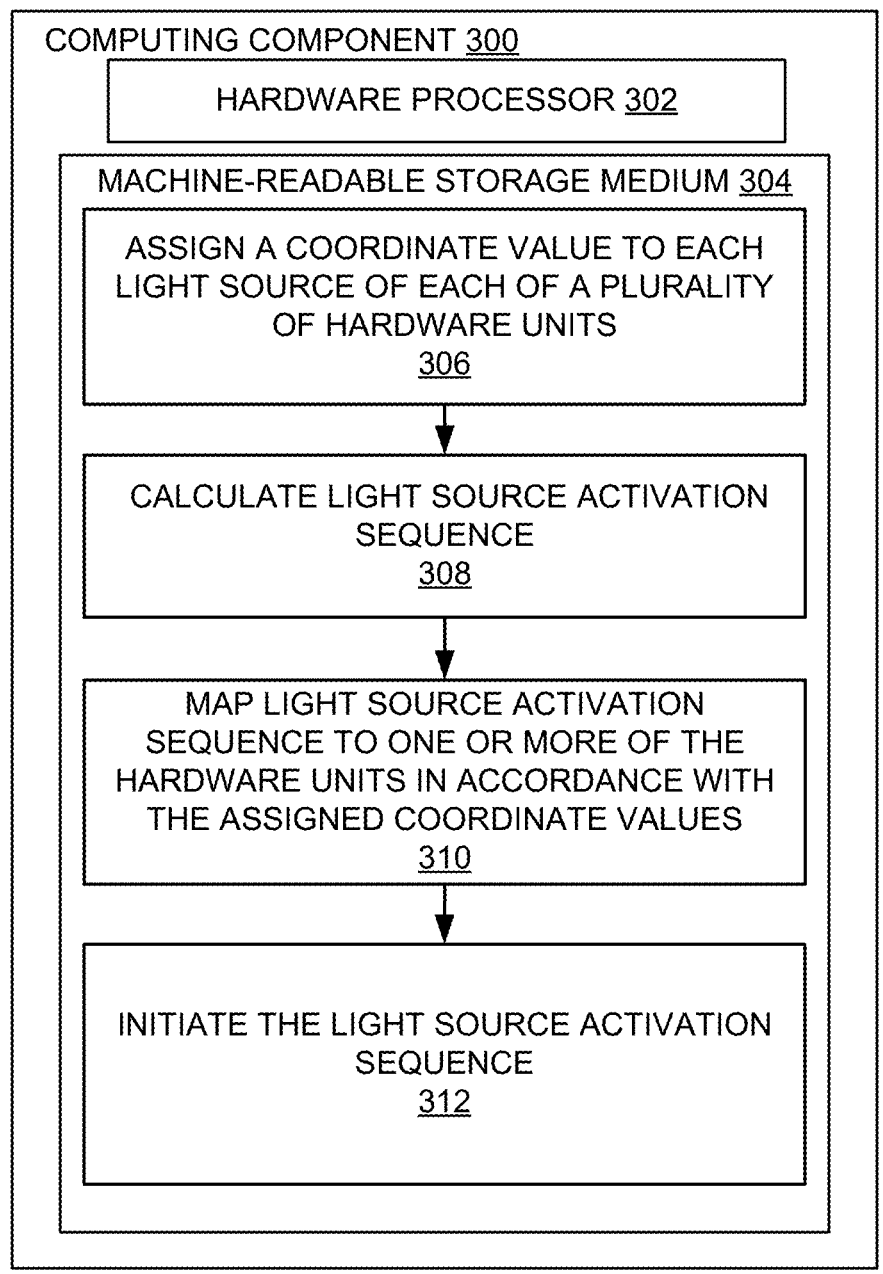
FIG. 3 is a block diagram of an example computing component or device for controlling one or more UIDs of one or more hardware units in a multiple chassis computing environment in accordance with one embodiment.

FIG. 3 is a block diagram of an example computing component or device 300 for controlling one or more UIDs of one or more hardware units in a multiple chassis computing environment in accordance with one embodiment. Computing component 300 may be, for example, a server computer, a controller, or any other similar computing component capable of processing data, such as a UID controller (as contemplated above). In the example implementation of FIG. 3, computing component 300 includes a hardware processor 302, and machine-readable storage medium 304. In some embodiments, computing component 300 may be an embodiment of a processor, e.g., processor 202 of UID control system 200 of FIG. 2, for example.

Hardware processor 302 may be one or more central processing units (CPUs), semiconductor-based microprocessors, and/or other hardware devices suitable for retrieval and execution of instructions stored in machine-readable storage medium, 304. Hardware processor 302 may fetch, decode, and execute instructions, such as instructions 306-312, to control processes or operations for controlling one or more UIDs in accordance with one embodiment. As an alternative or in addition to retrieving and executing instructions, hardware processor 302 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 304, may be any electronic, magnetic, optical, or other physical storage device that contains or stores executable instructions. Thus, machine-readable storage medium 304 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 304 may be a non-transitory storage medium, where the term "non-transitory" does not encompass transitory propagating signals. As described in detail below, machine-readable storage medium 304 may be encoded with executable instructions, for example, instructions 306-312. Machine-readable storage medium 304 may be an embodiment of memory 204 of FIG. 2.

Hardware processor 302 may execute instruction 306 to assign a coordinate value to each light source of each of a plurality of hardware units. As noted above, a light source may comprise a single LED, a multi-color LED, such as a tri-color LED, an LCD, or other light source. In this way, a desired lighting sequence can be achieved regardless of what light source(s) of a hardware unit may happen to correspond to a coordinate value. That is, and as discussed with respect to FIG. 2, a lighting sequence can be specified or set forth based on coordinate values, and the hardware unit(s) currently corresponding to coordinate values associated with a light source to be activated/deactivated effectuates a particular aspect or portion of the lighting sequence.

In some embodiments, prior to assignment of coordinate values to each of the light sources, a full inventory of the computing system, e.g., multiple chassis computing system, being managed. For each device or hardware unit in the inventory, known manufacturing schematics of the device/hardware unit and it's container or enclosure may be leveraged to allow coordinates to be assigned to each light source for that device or hardware unit. The position of a light source relative to the physical dimensions of each hardware unit is known at manufacture time and can be saved in an EEPROM to allow hardware units to "self-describe." If one hardware unit replaces another hardware unit, coordinate assignment list or mapping 210 may be updated.

For hardware units that are proximal but not directly coupled, manual user input may be used to orient them to each other. In this way, lighting sequences such as those that animate or display movement of light across multiple chassis can be accommodated. For example, user input may comprise relative chassis location so that a lighting sequence can progress across the multiple chassis. Relative chassis location can be manually-determined coordinate assignment by comparing a coordinate map to chassis location. In some embodiments, the manual user input may comprise defining that one chassis of unknown position is located 12 inches above and 3 inches to the left of a chassis whose location is already known and mapped with coordinates. These relative values allow for calculation of absolute positioning due to the known location of the other components.] Once coordinates have been assigned, a 2D or 3D view of all light sources in an environment or some subset thereof is known.

Hardware processor may execute instruction 308 to calculate a light source activation sequence. In some embodiments, remote UID controller 222a may dynamically determine an appropriate lighting sequence based on a particular event(s) sensed or determined by event manager 214, e.g., a mapping or correlation between hardware unit condition and some set of animations or combinations of sets of animations. In some embodiments, remote UID controller 222a may access a lighting sequence 224 to determine coordinates and actions (activate/deactivate) a light source at those coordinates are to perform. That is, and during runtime, depending on the type of event or condition sensed by event manager 214, the target hardware unit or aspect/portion thereof may be identified for a particular animation. Again, this could be a hardware unit that is experiencing a fault or that otherwise requires customer or user attention. For example, a "device failed" notification or determination by event manager 214 may be associated with a "converge a red circle to the target hardware unit" animation. This may comprise some subset of light sources neighboring the target hardware unit to display concentric red circles by activating a first set of red sub-LEDs (where the light sources are tri-colored LED light sources, for example) that make up a circle around or that surround the target hardware unit, deactivating the first set of red sub-LEDs and activating a second set of red sub-LEDs that make up a smaller circle or more closely surround the target hardware unit, and so on.

Hardware processor 302 may execute instruction 310 to map the light source activation sequence to one or more of the hardware units in accordance with the assigned coordinate values. That is, with the target hardware unit identified and an animation selected or determined, coordinating the actuation of light sources that play-out the animation is performed next. That is, a series of UID control commands is generated by remote UID controller 222a that correspond to the desired lighting sequence at the desired coordinate locations.

For example, the lighting sequence may again comprise a notification radiating outward from the coordinate value of the hardware unit to identify in a ring or other surrounding shape or formation of hardware units with UIDs that are closest in proximity to the target hardware unit. It should be understood that a target hardware unit may comprise the entire hardware unit as the target, or in some embodiments, the target may be some section/portion or other particular aspect of a hardware unit rather than the hardware unit as a whole. This particular lighting sequence may continue by activating LEDs to in a radiating outward fashion from each ring, adding a set of hardware units to each ring that are in closest proximity to the previous ring. This can be accomplished by exploring the 3D coordinate space and finding out which hardware units fall into each ring (vis-à-vis the coordinate assignments 210). The rings will equate to stages in the animation. For example, if an animation is the "converge a red circle to the target hardware unit" lighting sequence described above, remote UID controller 222a may generate the following control commands:
ring 6 (outermost), turn on all LEDs, RED
wait 0.2 seconds
ring 6 (outermost), turn off all LEDs, ring 5 turn on all LEDs, RED
wait 0.2 seconds
ring 5, turn off all LEDs, ring 4 turn on all LEDs, RED
wait 0.2 seconds ring 4, turn off all LEDs, ring 3 turn on all LEDs, RED wait 0.2 seconds ring 3, turn off all LEDs, ring 2 turn on all LEDs, RED wait 0.2 seconds ring 2, turn off all LEDs, ring 1 turn on all LEDs, RED wait 0.2 seconds ring 1, turn off all LEDs, target device, turn on all LEDs, RED flash target device LED 10 times with 0.2 seconds between flashes turn off target device LED, repeat animation from ring 6

Hardware processor 302 may execute instruction 312 to initiate the light source activation sequence. It should be understood, as previously discussed, a lighting sequence may involve light source activation as well as deactivation in some embodiments. Control command messages transmitted by remote UID controller 222a can vary depending on the hardware unit at issue. Some hardware units may be accessible by remote UID controller 222a over an IP network by way of a RESTful API through which JSON documents can be sent (as alluded to above). Other hardware units may be reachable as part of a CAN bus network where each hardware unit is receiving all light source actuation messages but only acting on the messages that apply to it. Some other hardware units may be directly reachable by a locally attached CPLD that implements PWM on local UID controller 222b, which may be a local LED controller, to flash its red/blue/green sub-LEDs in a way to give a perceived appearance of the color red.

Figure 4A:
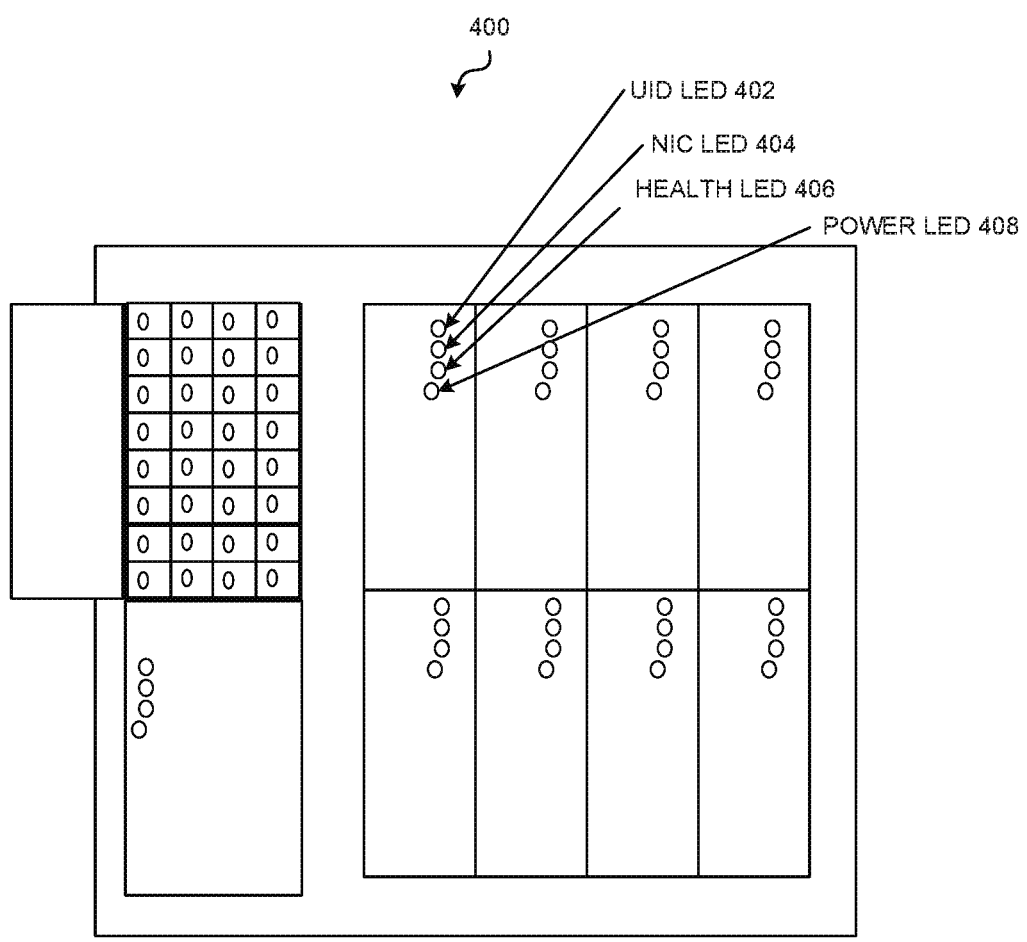
FIG. 4A illustrates an example hardware unit chassis and associated UIDs in accordance with one embodiment.

FIG. 4A illustrates an example of chassis 400, which may be an embodiment of the multiple server blade chassis 30 of FIGS. 1A-1C. Chassis 400 may comprise an enclosure for holding multiple hardware units in the form of multiple server blades, each of which may have some set of UIDs. In this example, each server blade may have one or more status lights, e.g., UID LED 402, a network interface card (NIC) LED 404, a hardware unit health LED 406, and a power LED 408. It should be understood that although some embodiments are described herein as relating to UIDs, any light source (if manipulation thereof is allowed) may be used as part of a lighting sequence as contemplated herein.

Figure 4B:
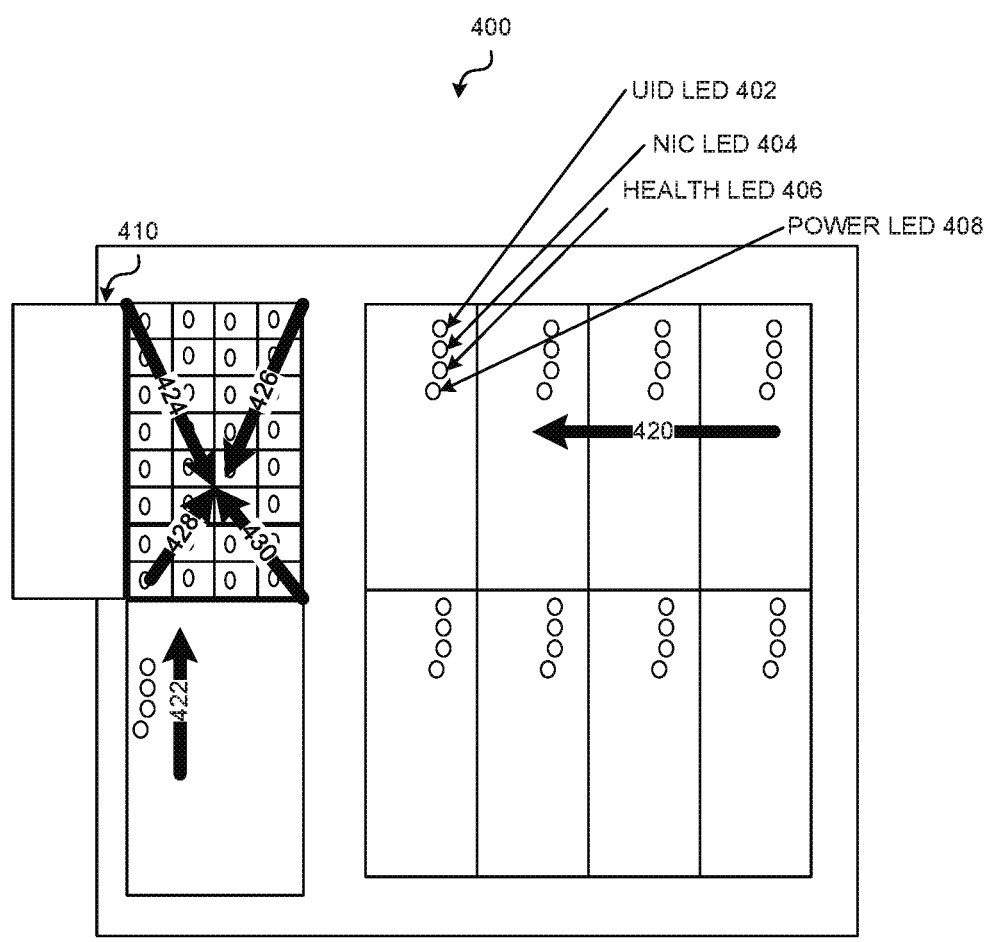
FIG. 4B illustrates an example lighting sequence implemented by the example hardware unit chassis of FIG. 4A.

FIG. 4B illustrates chassis 400 in the midst of an example lighting sequence, where the arrows show an example progression of LED actuations (animation). For example, each UID, NIC, health, and power LED of each server blade in the top row of chassis 400 may activate in a sequential fashion beginning from the server blade furthest from a target hardware unit 410 (which may be a shared memory array) shown by arrow 420. The lighting sequence may further include sequential activation of each of a plurality of LEDs associated with a neighboring shared memory array shown by arrow 422. Further still, the lighting sequence may include a pinpointing of a particular memory unit of target hardware unit 410 vis-à-vis a progression of lighting to the memory unit shown by arrows 424-430.

As previously alluded to, brightness may be a consideration for a lighting sequence, and for performance reasons, some local UID controller may receive a duration value at the beginning. In this way, a subsequent command to deactivate a UID need not be transmitted. It should be understood particular commands and/or the manner in which commands may be given can be tailored or customized to a particular environment and/or the capabilities of each hardware unit or subset of hardware units in the environment. For example, a hardware unit may self-describe that it can only display the color green with its LEDs. This information may cause the remote UID controller to exempt this hardware unit from a particular lighting sequence because green is not a good fit for the animation.

In some embodiments, a lighting sequence can be defined as an animation of a series of rasters of an X,Y,Z coordinate set, and then mapping each hardware unit in the known inventory to a coordinate (or coordinates) on the raster. As each raster is rendered, all hardware units/LEDs are sent their next LED setting information to be used for a subsequent frame of the raster for rendering. It should be understood that the kinds of a lighting sequences and manner of implementation can vary in different embodiments.

Figure 5:
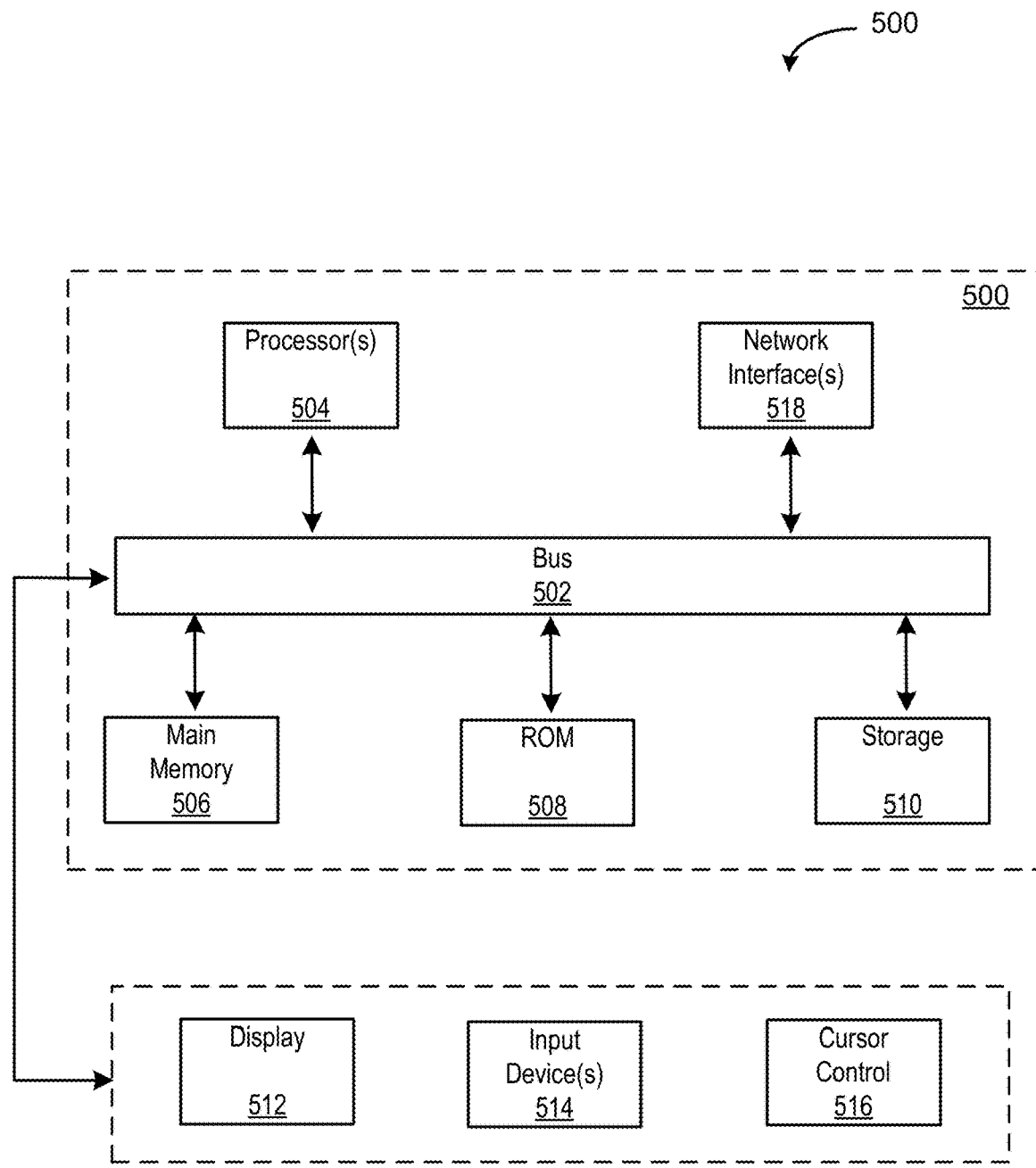
FIG. 5 illustrates an example computing component in which various embodiments described herein may be implemented.

FIG. 5 depicts a block diagram of an example computer system 500 in which various of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions. Also coupled to bus 502 are a display 512 for displaying various information, data, media, etc., input device 514 for allowing a user of computer system 500 to control, manipulate, and/or interact with computer system 500. One manner of interaction may be through a cursor control 516, such as a computer mouse or similar control/navigation mechanism.

In general, the word "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

What is claimed is:

1. A method for hardware unit identification, comprising:
assigning a coordinate value to each light source of each of a plurality of hardware units, wherein the assignment of the coordinate value comprises an assignment of a two-dimensional or three-dimensional coordinate value of a coordinate map representative of all or a subset of the plurality of hardware units;
determining an inventory reflecting presence of each of the plurality of hardware units;
calculating a light source activation sequence;
mapping the light source activation sequence to one or more of the plurality of hardware units in accordance with assigned coordinate values; and
initiating the light source activation sequence.

2. The method of claim 1, wherein the initiation of the light source activation sequence occurs in response to detection of one or more events associated with a target hardware unit.

3. The method of claim 2, wherein the light source activation sequence comprises activation of one or more of the light sources of the plurality of hardware units representative of a directional animation leading to the target hardware unit.

4. The method of claim 3, wherein the light source activation sequence comprises at least one of sequentially activating the one or more of the light sources.

5. The method of claim 3, wherein the light source activation sequence comprises activating the one or more of the light sources for a determined duration of time.

6. The method of claim 1, further comprising transmitting one or more commands from a light source controller remotely located from the light sources.

7. The method of claim 6, wherein each of the one or more commands comprises a desired intensity level at which at least one light emitting diode (LED) of a light source is to be activated, an identifier of the at least one LED of the light source to be activated, and a duration specifying a time during which the at least one LED is to be activated at the desired intensity level.

8. The method of claim 6, wherein the transmission of the one or more commands comprises an application program interface (API) call.

9. The method of claim 6, wherein the transmission of the one or more commands comprises transmission of the one or more commands directly to each of the light sources impacted by the light activation sequence over a controller area network (CAN) bus.

10. The method of claim 6, wherein the transmission of the one or more commands comprises transmission of the one or more commands to a light source controller implemented locally with the light sources.

11. The method of claim 1, wherein the assignment of the coordinate value to each light source of each of a plurality of hardware units is based on the determined inventory.

12. A lighting controller system, comprising:
a processor; and
a memory including instructions causing the processor to control one or more light
sources associated with one or more hardware units in a data center, comprising:
assigning a coordinate value to each light source associated with at least one subset of the one or more hardware units, wherein the assignment of the coordinate value comprises an assignment of a two-dimensional or three-dimensional coordinate value of a coordinate map representative of all or a subset of the plurality of hardware units;

determining an inventory reflecting presence of each of the plurality of hardware units calculating a lighting sequence;

mapping the lighting sequence to one or more of the light sources of the at least one subset of the one or more hardware units; and initiating the lighting sequence.

13. The system of claim 12, wherein the one or more lights sources comprises a status identifier associated with at least one of a hardware unit and an enclosure of the at least one hardware unit.

14. The system of claim 12, wherein the one or more light sources comprises one of a light emitting diode (LED), a combination of LEDs, and a liquid crystal display (LCD).

15. The system of claim 12, wherein the memory includes instructions further causing the processor to transmit of one or more commands controlling operation of the one or more light sources to effectuate the lighting sequence.

16. The system of claim 15, wherein the system comprises a remote lighting controller transmitting the one or more commands as an application program interface (API) call.

17. The system of claim 15, wherein the system comprises a remote lighting controller transmitting the one or more commands directly to each of the one or more light sources over a controller area network (CAN) bus.

18. The system of claim 15, wherein the system comprises a remote lighting controller transmitting the one or more commands to at least one lighting controller implemented locally with the one or more light sources.

19. The system of claim 12, wherein the assignment of the coordinate value to each light source of each of a plurality of hardware units is based on the determined inventory.

* * * * *